(12) United States Patent
Linz et al.

(10) Patent No.: US 6,195,529 B1
(45) Date of Patent: Feb. 27, 2001

(54) TRANSMISSION BLOCKER FOR MOBILE RADIO STATIONS AND METHOD FOR PREVENTING TRANSMISSION ACTIVITIES OF A MOBILE RADIO STATION

(76) Inventors: Joachim Linz, Im Apfelgarten 23, D-53117 Bonn; Regina Baumle, Hegerfeldstr. 37, D-77756 Hausach, both of (DE)

( * ) Notice: Subject to any disclaimer, the term of this patent is extended or adjusted under 35 U.S.C. 154(b) by 0 days.

(21) Appl. No.: 09/041,007

(22) Filed: Mar. 12, 1998

(51) Int. Cl.[7] .................................................. H04K 3/00
(52) U.S. Cl. ................................ 455/1; 455/103; 342/14
(58) Field of Search ........................... 380/6, 49, 1, 103, 380/422, 14, 95

(56) References Cited

U.S. PATENT DOCUMENTS

| | | | |
|---|---|---|---|
| 4,357,709 | * 11/1982 | Butler et al. | 455/20 |
| 4,498,193 | * 2/1985 | Richardson | 455/1 |
| 5,001,771 | * 3/1991 | New | 455/1 |
| 5,220,680 | * 6/1993 | Lee | 455/102 |
| 5,321,405 | * 6/1994 | Luck | 342/15 |
| 5,404,580 | 4/1995 | Simpson et al. | |
| 5,655,019 | * 8/1997 | McKernan et al. | 380/6 |
| 5,822,429 | * 10/1998 | Casabona et al. | 380/9 |
| 5,864,549 | * 1/1999 | Honkasalo et al. | 370/335 |

FOREIGN PATENT DOCUMENTS

| | | | |
|---|---|---|---|
| 0 546 849 | 6/1993 | (EP) | H04B/7/26 |
| 0 568 824 | 11/1993 | (EP) | H04Q/7/04 |
| 2 164 227A | 3/1986 | (GB) | H04B/1/38 |

* cited by examiner

Primary Examiner—Edward F. Urban
Assistant Examiner—Blane J. Jackson
(74) Attorney, Agent, or Firm—Antonelli, Terry, Stout & Kraus, LLP

(57) ABSTRACT

The invention relates to a transmission blocker for mobile telephones as well a method for preventing transmission activities of mobile telephones in the vicinity of safety-relevant electronic devices, comprising a device for transmitting radio signals as interference signals in the frequency range of the relevant mobile radio network in such fashion that synchronization of the mobile telephone with a radio station and/or decoding of the information in the signaling channel and/or recognition of the relevant signals from the mobile radio network can be prevented.

8 Claims, 2 Drawing Sheets

TRANSMISSION BLOCKER FOR MOBILE RADIO STATIONS AND METHOD FOR PREVENTING TRANSMISSION ACTIVITIES OF A MOBILE RADIO STATION

The invention relates to a method for preventing transmission activities of a mobile radio station, especially a mobile telephone in a mobile radio system with a mobile radio network and with fixed base stations, with the base station transmitting signals into the mobile radio network as synchronization information with a basic power and the mobile radio station receiving the signals with a receiving power that is reduced by the interference power present in the mobile radio network, and the mobile radio station being able to transmit only when it receives a signal with a receiving power that exceeds a predetermined threshold value.

The invention also relates to a transmission blocker to prevent transmission activities of a mobile radio station when working the method.

Transmission blockers for mobile radio stations, such as mobile telephones for example, to prevent transmission activities or to block them have not been known previously.

In areas with safety-relevant electronic devices, a transmitting mobile telephone can cause interference that can result in danger. At the present time, attention is directed to such danger by spoken or written warnings on the spot, given by stewardesses aboard aircraft for example.

The holders or users of mobile telephones, such as cell phones, usually cannot be recognized as such. The persons responsible for safety, at airports, aboard aircraft, etc. for example, must therefore depend on the potential users understanding these warnings and behaving in a responsible way by switching off their mobile telephones. This solution results in uncertain situations and is therefore unsatisfactory.

The goal of the invention is to prevent mobile radio stations such as mobile telephones that function according to known principles, from transmitting in order thus to reduce the danger of safety-relevant interference without the cooperation of the owner or potential user, especially in protected areas PA limited in space and time.

This goal is achieved by a method according to the invention according to claim 1 as well as a device designed in accordance with claim 1 and termed a transmission blocker.

Advantageous embodiments of the method and the transmission blocker can be found in the characterizing features of the subclaims.

The method according to the invention for preventing transmissions by mobile telephones with limitations in space and time or for interrupting the transmission of mobile telephones is therefore characterized by the fact that an interference signal with an interference signal power is generated in the mobile radio network, with the interference signal power being chosen to be large enough that the signal that is radiated at the basic power by the base radio station, upon receipt by the mobile radio station, no longer exceeds the threshold value of the receiving power. In addition, the invention proposes a device for working the method. The device is termed a transmission blocker. The transmission blocker according to the invention is characterized by the fact that it comprises devices for generating and transmitting radio signals as interference signals in the frequency range of the relevant corresponding mobile radio network to prevent transmission activities of a mobile radio station, especially a mobile telephone, in a mobile radio station with a mobile radio network and with fixed base radio stations, with the base radio stations transmitting signals (S) as synchronization information for receipt by the mobile radio station in order to permit the mobile radio station to transmit, in such fashion that synchronization of the mobile radio station with a base radio station by means of the signal transmitted by the mobile radio station to be received by the base radio station and/or a decoding of the signals transmitted by the base radio station by the mobile radio station and/or a recognition of the signals emitted by the base radio station by the mobile radio station is preventable in a protected area defined by the interference signals, their interference signal power, and the transmission duration of the interference signals.

The method according to the invention and a transmission blocker according to the invention that operates according to the method have the following features:

1. The transmission blocker transmits radio signals as interference signals that prevent the mobile telephone from synchronizing with the so-called base radio station or Ifrom decoding the signals emitted by a signaling channel of the base radio station as synchronization information, or generally recognizing the relevant signals from the mobile radio network.
2. The transmission blocker prevents transmission on all mobile radio stations that can make transmission contact with the base radio stations only when the relevant signals that serve as synchronization information from the base radio station are received and have been recognized perfectly by the mobile radio station.
3. The transmission blocker uses an interference signal which, owing to its nature and strength, has no negative influences on the safety-relevant electronic devices present in the area to be protected PA.
4. The transmission blocker can be adjusted so that it does not have a disturbing effect on radio networks outside the protected area PA within which it is employed.
5. Optionally, the transmission blocker can be provided with equipment that limits its influence to the mobile radio systems that supply the protected area in question, GSM or CDMA for example.
6. Optionally, the transmission blocker can be provided with equipment that enables it to measure the prevailing levels of the existing mobile radio networks and to create an optimum interference level by means of a corresponding interference signal SS with an interference signal power PSS that is sufficient to prevent the mobile radio stations, like the mobile telephones, from transmitting.

The invention will now be described in conjunction with FIGS. 1 to 3, where FIG. 1 shows the functional design of a transmission blocker;

Figure 3:
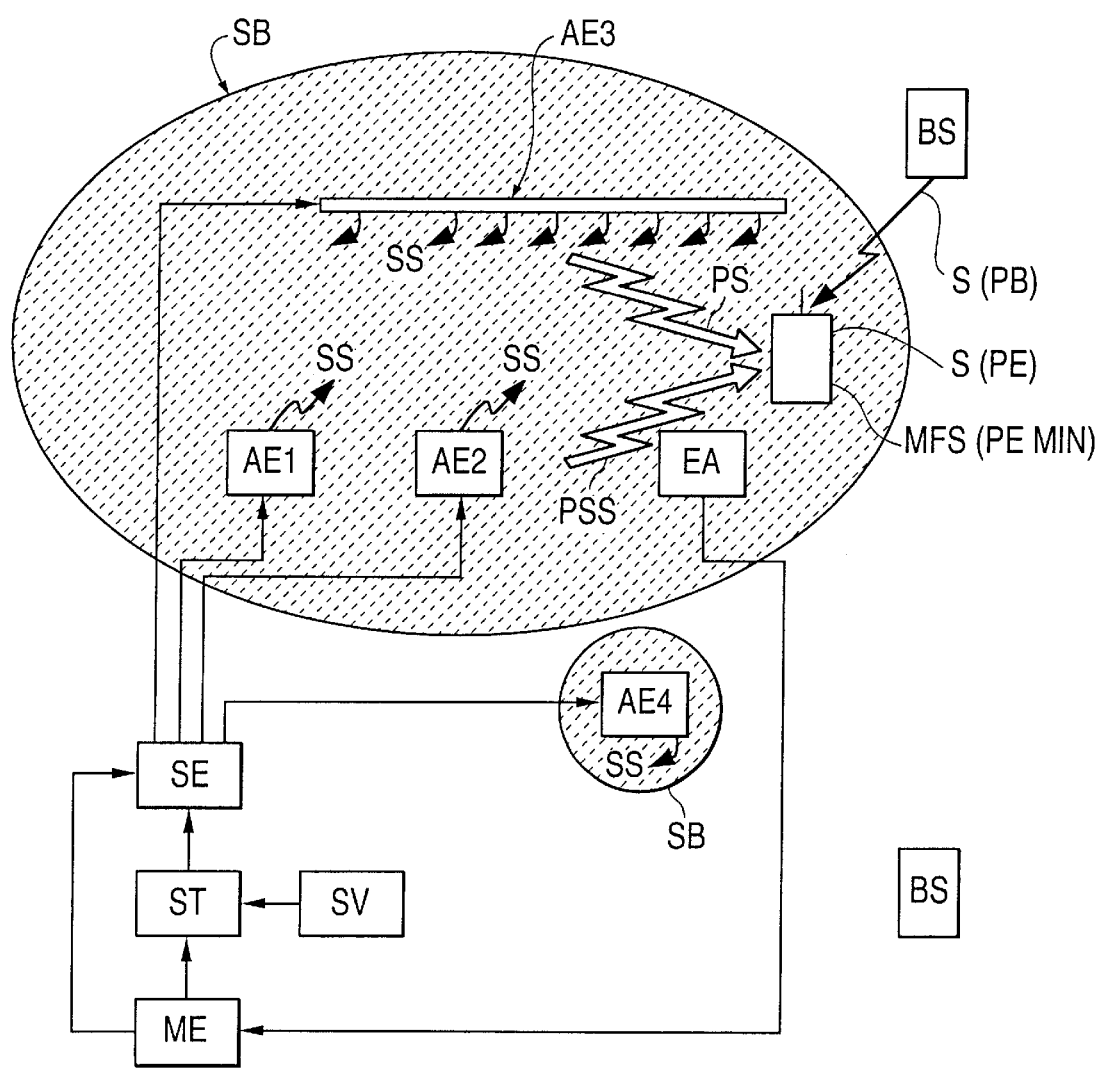
FIG. 3 shows the functional diagram of the operation of the transmission blocker in a mobile radio network, producing a protected area.

A mobile radio system with a mobile radio network in which the invention can be used, see FIG. 3, consists as a rule of several radio stations, hereinafter called basic radio stations BS, that radiate signals S with a basic power PB as synchronization information. The power PB is damped by the radio field of the mobile radio network, and signals S arrive with a very much reduced receiving power PE at a mobile radio station MFS. Before this mobile radio station MFS can transmit in order to get in contact with the mobile radio network, it must first receive and decode the synchronization information from a suitable base station BS in the form of signals S. For this purpose, the receiving power PE of the signals S transmitted by the base radio station BS and received by mobile radio station MFS must exceed a threshold value of a receiving power PE-MIN that can be determined in advance. This threshold value or minimum value of receiving power PE-MIN is determined accordingly from the specific minimum signal interference interval for the individual mobile radio station as well as the interference power PS present on the signaling channel of the base function stations.

PE is always smaller than PB.

The same applies to a mobile radio station MFS already in the transmitting state. In order to be able to maintain the link between the mobile radio station and the mobile radio network, a signal S that is regularly transmitted during the connection as synchronization information from the base function on the signaling channel must arrive at the mobile radio station with a power that at least corresponds to the receiving power PE-MIN, in order to be able to be received by the mobile radio station. Otherwise, the link is eliminated (broken off) after a safety interval (typically in the range of several seconds) specified as a rule by the mobile radio station.

The method of the transmission blocker according to the invention consists in increasing the interference power PS which is present in every radio field, which leads to a reduction of the transmission power B of signal S up to the receiving power PE (PB−PS=PE) in a protected area PA to be protected by an additional interference signal power PSS, so that in the protected area the available transmitting power PB of the mobile radio network arrives at the mobile radio stations located in the protected area PA with a receiving power PE that has been reduced to the point where the threshold value PE-MIN is no longer exceeded, in other words:

PB−PS−PSS is less than PE−MIN.

From this following blocking condition, the following methods for blocking or preventing transmission activities of a mobile radio station such as a mobile telephone:

A mobile radio station MFS which is switched on but not transmitting will not perform any transmitting activities, or a transmitting mobile radio station MFS will cease to transmit after a short time, if the mobile radio station additionally receives an interference signal SS on the channel or channels that a non-transmitting mobile station uses in order to synchronize itself with a mobile radio network or the channels that a transmitting mobile radio station uses during a connection. Said interference signal SS on a given channel at the location of the mobile radio station has such a high interference signal power PSS that the threshold value PE−MIN of signal S is not reached. The interference signal SS comprises an artificially generated additional interference power PSS which, in conjunction with the interference power already generally available in the radio field, causes such damping of the transmitting power PB on the way to the mobile radio station that the threshold value PE−MIN of the receiving power for the mobile radio station is no longer reached.

Protected area PA results from the area in which this blocking condition is met. The goal of the transmission blocker is to generate interference signals SS with a corresponding interference signal power PSS and thereby to create protected area PA.

Figure 1:
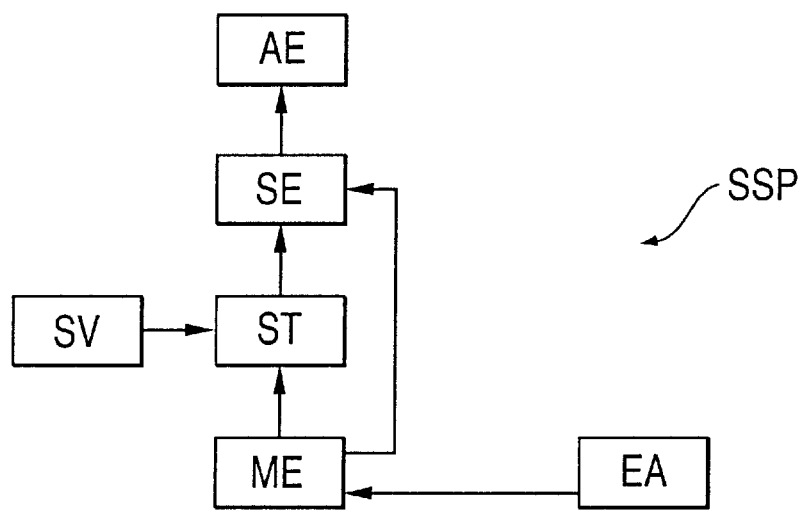

Transmission blocker SSP, see FIG. 1, generally consists of an interference spectrum generating unit SE, a radiating unit AE, a control device ST, a power supply SV, and optionally a measuring unit ME.

There are various known methods of designing the interference spectrum generating unit SE. The maximum output power of the SE is typically in the range from −10 dBm to +20 dBm. The interference signal shape generated by the SE must generally be chosen so that the blocking conditions can be met in accordance with the invention. However, in order to prevent influencing stations other than the mobile radio stations, a signal shape is advantageously used which has a uniformly distributed power in the frequency range FB-S to be protected, but has as little power as possible outside this area. In particular, pulsed power from time-multiplex systems, known for example from the GSM system, is avoided. Instead it is proposed that a broadband pseudo interference signal or a family of discrete carrier signals or a corresponding frequency-modulated signal be used as interference signal SS, with the family corresponding to the channel pattern of the mobile radio system.

Figure 2:
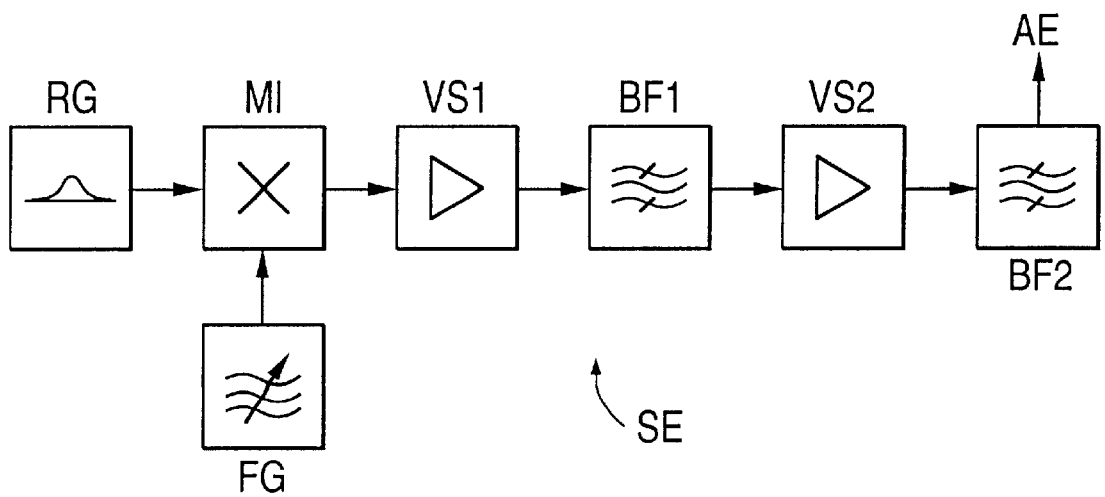
FIG. 2 shows the functional design of a control device.

The interference spectrum generating unit SE for interference signal SS for example, as shown in FIG. 2, can consist of a broadband pseudo interference generator RG, a frequency generator FG for generating the carrier frequency, a mixing stage Ml for transforming a basic signal to the desired frequency band of an amplifier stage VSI for decoupling the interference signal, a bandpass filter BF1 for generating the desired frequency spectrum in the frequency range FB-STOP to be interfered with, another amplifier stage VS2 controlled by the SE for power amplification, and an additional bandpass filter BF2 for limiting the interference signal outside the FB-STOP.

Radiating device AE can be an individual antenna for creating one discrete radiating point or a combination of spatially distributed antennas AE1 and AE2 or a slot cable, such as leak cable AE3 or a combination of these devices. Since the radio field of both the base function stations and the transmission blocker cannot be delimited precisely there is a boundary area, at the edges of protected area PA that can be varied in space and time, with an undefined behavior of the mobile radio stations. The size of the limiting area can be minimized by a suitable choice of radiation device AE.

Control device ST in the simplest case can consist of elements for switching the transmission blocker on and off or additionally of power control or power regulation for interference signal SS and/or a component monitoring device and function display for example.

Power supply SV provides the components of the transmission blocker with current which it obtains from an existing onboard network for example or from storage batteries in the case of small mobile designs.

For acceptance reasons it may be desirable to minimize the power and/or energy irradiated by the transmission blocker, down to a value of zero in areas without any mobile radio supply.

To minimize the radiated power, the transmission blocker can therefore be equipped optionally with a measuring device ME that adapts the interference signal power of interference signal SS to the signal to be interfered with in such fashion that only as much power is radiated as is required to fulfill the blocking condition reliably.

Measuring device ME regularly measures, on all channels of the frequency range to be protected, the power that can be received by mobile radio networks and accordingly controls the power of interference signal SS by means of control device ST.

Measuring device ME consists for example of one or more receiving antennas EA that can be located inside or outside protected area PA, as well as a measurement receiver MF and an evaluation and control device AW that converts the information supplied by measuring receiver MF into control instructions for the control device. ME is supplied by power supply SV of the transmission blocker. Optionally, radiating device AE of the transmission blocker can also be used as a receiving antenna EA.

In order to prevent measuring device ME from being influenced by the power radiated by the transmission blocker, evaluation and control device AW can switch of interference signal SS during measurement time T-MESS of mobile radio signal S. T-MEISS must therefore be selected to be shorter than the synchronization time of the mobile radio station, such as a mobile telephone, which is typically several seconds.

To minimize the radiated energy, the inertia of the mobile radio stations during resynchronization to a base radio station following a synchronization loss can be utilized: optionally, the control device can be supplemented by a time-dependent control in such fashion that interference signal SS is generated only temporarily so that the average energy radiated by the transmission blocker is reduced.

To improve service in aircraft for example, the transmission blocker can be deactivated apart from critical phases in an aircraft during flight at high altitude for example, or during prolonged waits on the ground. In this way, the passengers could be permitted to use the telephone again during a prolonged wait on the ground, since active mobile radio stations, such as mobile radio telephones, can be deactivated if necessary within several seconds by activating the transmission blocker, and this action can be announced by service personnel making an announcement. For this purpose, the transmission blocker can optionally contain operating elements that allow control from both the aircraft cabin and the cockpit for example.

The protected area PA generated by a transmission blocker does not have to be continuous. Thus for example an extension of the protected area of the aircraft cabin into the baggage compartment by adding a radiating device AE connected by a cable with interference spectrum generating unit SE can be advisable, see AE4 in FIG. 3, since mobile radio telephones that are not deactivated there because of the lack of an ability to influence them during flight could constitute a particular risk.

The spatial limitation of protected area PA is achieved by suitable choice of the power of interference signal SS to be generated as well as by a suitable choice of the location and nature of radiating device AE. The required interference signal power of interference signal SS results from the blocking condition as well as a safely margin that is based on the fading and shadowing values to be used and typically is in the order of 5 to 10 decibels. For reliable maintenance of blocking conditions, because of the variability of the mobile radio field with a lack of a measuring device ME, assumptions must be made about the maximum power level to be expected for the mobile radio network in the protected area PA to be created.

The transmission blocker could be installed for example in an aircraft that is at an airport supplied by mobile radio networks based on the GSF standard. The interference signal SS of the transmission blocker, which in this case lies in the GSM frequency range, must have its strength adjusted so that the readout of the BCCH channels of the supplying base radio stations is prevented by the mobile telephones, or reception of messages on the TCH in mobile telephones that are being used for telephony is suppressed. A GSM-conforming mobile telephone in this case will not attempt to transmit The strength of interference signal SS of the transmission blocker can be set very much lower than that of transmission signal S of the mobile telephone, since the transmission blocker is a great deal closer to the mobile telephone than the mobile telephone of the fixed base radio station of the GSM network. As a result, the influence on the safety-relevant electronics by the transmission is very small.

Furthermore it is also possible to equip a transmission blocker with a simultaneous ability to radiate various interference signals ss, so that, various mobile radio systems and/or mobile radio stations transmitting on different frequencies can accordingly be temporarily prevented from transmitting in an area pa to be protected.

What is claimed is:

1. Transmission blocker to prevent transmitting activities of a mobile radio station, especially a mobile telephone, in a mobile radio system with a mobile radio network and with stationary base radio stations, with the base radio stations transmitting signals (S) as synchronization information for reception by the mobile radio station in order to allow the mobile radio station to transmit, including devices for generating and transmitting radio signals as interference signals (SS) in the frequency range of the relevant corresponding mobile radio network, in such fashion that synchronization of the mobile radio station with a base radio station by means of the signal (S) to be received by the mobile radio station and emitted by the base radio station and/or a decoding of the signal (S) transmitted by the base radio station can be prevented by the mobile radio station and/or recognition of the signal (S) emitted by the base radio station can be prevented by the mobile radio station in a protected area (PA) that can be established by the interference signal (SS) whose interference signal power (PSS) and the transmission time of the interference signal (SS) can be set, whereby the device for generating and transmitting interference signals (SS) comprises an interference spectrum generating unit (SC), a radiating unit (AE), a control device (ST), and a power supply (SV), and a measuring unit (ME) is provided for measuring the power (PEN) to be received by the mobile radio station, and the interference signal power (PSS) of the interference signal (SS) can be controlled by the measured values received.

2. Transmission blocker according to claim 1 characterized in that the measuring unit consists of one or more receiving antennas (EA), located inside or outside the protected area (PA), as well as a measuring receiver (MF), and an evaluating and control device (AW) that converts the information supplied by measuring receiver (MF) into control instructions to control control device (ST), and which is supplied by power supply (SV) of the transmission blocker.

3. Transmission blocker according to claim 2 characterized in that a radiating device (AE) of the transmission blocker can be used as a receiving antenna (EA).

4. Transmission blocker according to claim 1 characterized in that the interference spectrum generating unit (SC) for generating interference signal (SS) comprises a broadband pseudo interference generator (RG), a frequency generator (FG) for generating a carrier frequency, a mixer stage (M1) for transforming a base signal as the interference signal into the desired frequency band, an amplifier stage (VSI) for decoupling the interference signal, a bandpass filter (BF1) for generating the desired frequency spectrum in the frequency range to be interfered with (FB-STOP), another amplifier stage (VS2) controlled by interference spectrum generating unit (SC) for power amplification of the interference signal, and an additional bandpass filter (BF2)

for limiting the interference signal outside the frequency range to be interfered with.

5. Transmission blocker according to claim 1 characterized in that radiating device (AE) has a single antenna for creating a discrete radiating point or a combination of spatially distributed antennas (AE1 and AE2) or a slotted cable (AE3) or a combination of the above devices.

6. Transmission blocker according to claim 1 characterized in that the control device consists of elements for turning the transmission blocker off and on and possibly includes power control or regulation for the interference signal and/or a component monitoring system and function display.

7. Transmission blocker according to claim 1 characterized in that the power of interference signal (SS) of the transmission blocker can be adjusted in form and strength in such fashion that no disturbance is caused outside protected area (PA) and no negative influence is exerted on safety-relevant devices located in the protected area.

8. Transmission blocker according to claim 1 characterized in that, in order to avoid influencing measuring unit (ME) by the power radiated by the interference spectrum generating unit, the evaluation and control device (AW) has a mode of operation such that interference signal (SS) is switched off during the period of time (T-MESS) that signal (S) is being measured, with period of time (T-MESS) having to be chosen to be shorter than the synchronization time of the mobile radio station.

* * * * *